United States Patent

[11] 3,529,577

| [72] | Inventor | Harry L. McMenemy, Jr.<br>Richardson, Texas |
|---|---|---|
| [21] | Appl. No. | 793,058 |
| [22] | Filed | Jan. 22, 1969 |
| [45] | Patented | Sept. 22, 1970 |
| [73] | Assignee | Chemagro Corporation<br>Kansas City, Missouri<br>a corporation of New York |

[54] LIVESTOCK INSECTICIDE DISPENSER
9 Claims, 3 Drawing Figs.

[52] U.S. Cl. .................................................. 119/159, 119/158
[51] Int. Cl. ..................................................... A01k 13/00
[50] Field of Search ........................................... 119/158, 159

[56] References Cited
UNITED STATES PATENTS

| 983,820 | 2/1911 | Goff | 119/158 |
| 2,660,251 | 11/1953 | Birosh | 119/159 |
| 2,900,957 | 8/1959 | Peterson | 119/159 |
| 3,062,188 | 11/1962 | O'Day | 119/159 |
| 3,173,402 | 3/1965 | Cassel | 119/159 |
| 3,370,571 | 2/1968 | Knapp | 119/159 |

Primary Examiner—Aldrich F. Medbery
Attorney—Cushman, Darby and Cushman

ABSTRACT: The solution pour-on or spot-on device for applying solution to livestock comprises a solution reservoir with means for pressurizing the solution within the device; a solution applicator with an on-off control valve and a nozzle; and a solution metering assembly having cylinders with two-way floating pistons which are interconnected to the solution reservoir and the solution applicator through flow control valves whereby upon selective adjustment of the flow control valves and the actuation of the on-off control valve in the solution applicator, solution flows into the cylinders from the reservoir on one side of the pistons and the solution on the other side of the pistons is expelled from the cylinders out through the solution applicator and onto the livestock.

Patented Sept. 22, 1970

INVENTOR
HARRY L. McMENEMY, JR.

BY
*Cushman, Darby & Cushman*
ATTORNEYS 3,529,577

1

LIVESTOCK INSECTICIDE DISPENSER

BRIEF DESCRIPTION OF THE INVENTION

This invention relates to devices for applying solutions to livestock and, in particular, to a unique applicator for applying specific amounts of solution without the need for manually measuring the required amount of solution to be applied.

Heretofore, when treating livestock, such as dairy animals, beef cattle and the like with solutions such as insecticides utilized for the control of cattle grubs, the solution has been applied to the animal by manually dipping the solution from a bucket or pail with a calibrated dipper and attempting to pour the solution uniformly along the animal's back.

This means of applying solution to livestock has proved unsatisfactory for several reasons. Many of the solutions utilized in the treatment of livestock require that the amount of solution per application be governed by the body weight of the animal up to a certain weight with a set maximum amount of solution for animals over this weight. It is important that the amount of solution applied to the animal be kept within the specified range for effective treatment and, therefore, measurements performed by the manual measuring of the solutions with a dipper prove unsatisfactory in that such measurements cause error especially when the individual applying the solution is hurried. In addition, many of the solutions are poisonous if swallowed and harmful if inhaled, absorbed through the skin, or splashed or otherwise caused to contact the eyes of the individual applying the solution. Therefore, the use of a pail and dipper is highly unsatisfactory in that since the solution is exposed, any of the above can readily happen not to mention the damage to clothing which can result.

It is, therefore, a principal object of the present invention to provide a device which accurately dispenses a selected amount of solution for application on an animal during each actuation of the device.

It is a further object of the invention to provide a device which is ready to commence a new application cycle upon completion of the preceding application cycle so that the solution can be quickly applied to a series of animals without any delay between applications.

It is a still further object of the invention to provide a device which is highly portable to permit the device to be easily taken to wherever the livestock is being treated.

Another object of the invention is to provide a device which is simple in construction and durable so that it will withstand the handling to which it will be subjected during use on farms and the like without the need for repeated repairs.

It is yet a further object of the invention to provide a device wherein the solution is stored in a closed container to minimize the possibility of the solution coming into contact with the operator's eyes or skin and also to minimize the possibility of accidental poisoning.

Briefly, a preferred mode of carrying out the present invention comprises a solution reservoir, a solution applicator, and a metering device intermediate the reservoir and the applicator. The reservoir is a tank that is provided with a handpump for pressurizing the solution within the tank and throughout the system. The applicator is made up of an on-off control valve and a tubular extension having a fan-type nozzle thereon for either pouring the fluid down the backline of the animal or penetrating the hair of the animal to apply the solution in one spot. The metering device comprises one or more cylinders with each cylinder having two sets of inlet and exhaust ports on either side of a two-way floating piston. The inlet and exhaust ports of the cylinders are connected through valves to the solution reservoir and the solution applicator whereby the flow of solution from the solution reservoir to the inlet ports and from the exhaust ports to the applicator is such that when pressurized solution is being admitted to one side of a piston, solution on the other side of the piston is being expelled through the outlet port to the solution applicator.

2

The above objects and advantages of the present invention will become more apparent and other objects and advantages of the present invention will become apparent from the following detailed description when taken in conjunction with the accompanying drawings in which.

DETAILED DESCRIPTION OF THE INVENTION

Figure 1:
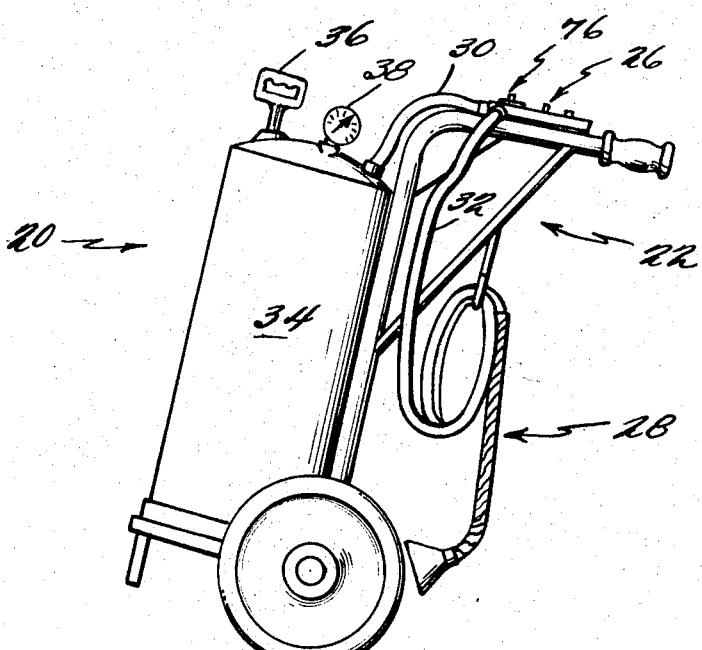
FIG. 1 is a side view of the applicator device mounted on a cart to facilitate the transport of the apparatus.

Referring now to the drawings, a preferred form of the invention, generally designated 20, is shown mounted on a cart 22 for transporting the apparatus to the various work areas. The applicator device 20 comprises a reservoir or supply tank 24, a metering device 26 and an applicator 28 which are interconnected by fluid lines 30 and 32. While a preferred form of the invention is illustrated, it is to be understood that the embodiments set forth in the detailed description of the invention and drawings are merely exemplary and are not intended to restrict the scope of the invention.

The reservoir or supply tank 24, as illustrated, comprises a hollow, cylindrical container 34, which is provided with a conventional hand air compressor or pump 36 for pressurizing the solution within the container, and a pressure gauge 38 to enable the operator to maintain the pressure within the reservoir and, consequently, the system within a certain specified range. While not shown, the container 34 can also be connected to a source of compressed air rather than using a hand pump 36.

The exhaust port 40 of the container 34 is a tube which extends from the upper end of the container to the lower end of the container with the tube being open at the lower end of the container to admit the pressurized solution into the tube and fluid line 30. An inlet port 42, which normally has a cap threadedly retained thereon for sealing purposes, is also provided on the upper end face of the container to permit the refilling of the container when the supply of solution in the container becomes exhausted. However, it is contemplated that other means can be provided for filling the container and that if desired, the whole end face of the container can be conventionally threadedly mounted in container 34 to permit removal of the end face for the cleaning or refilling of the container or any other servicing which should be required.

Figure 2:
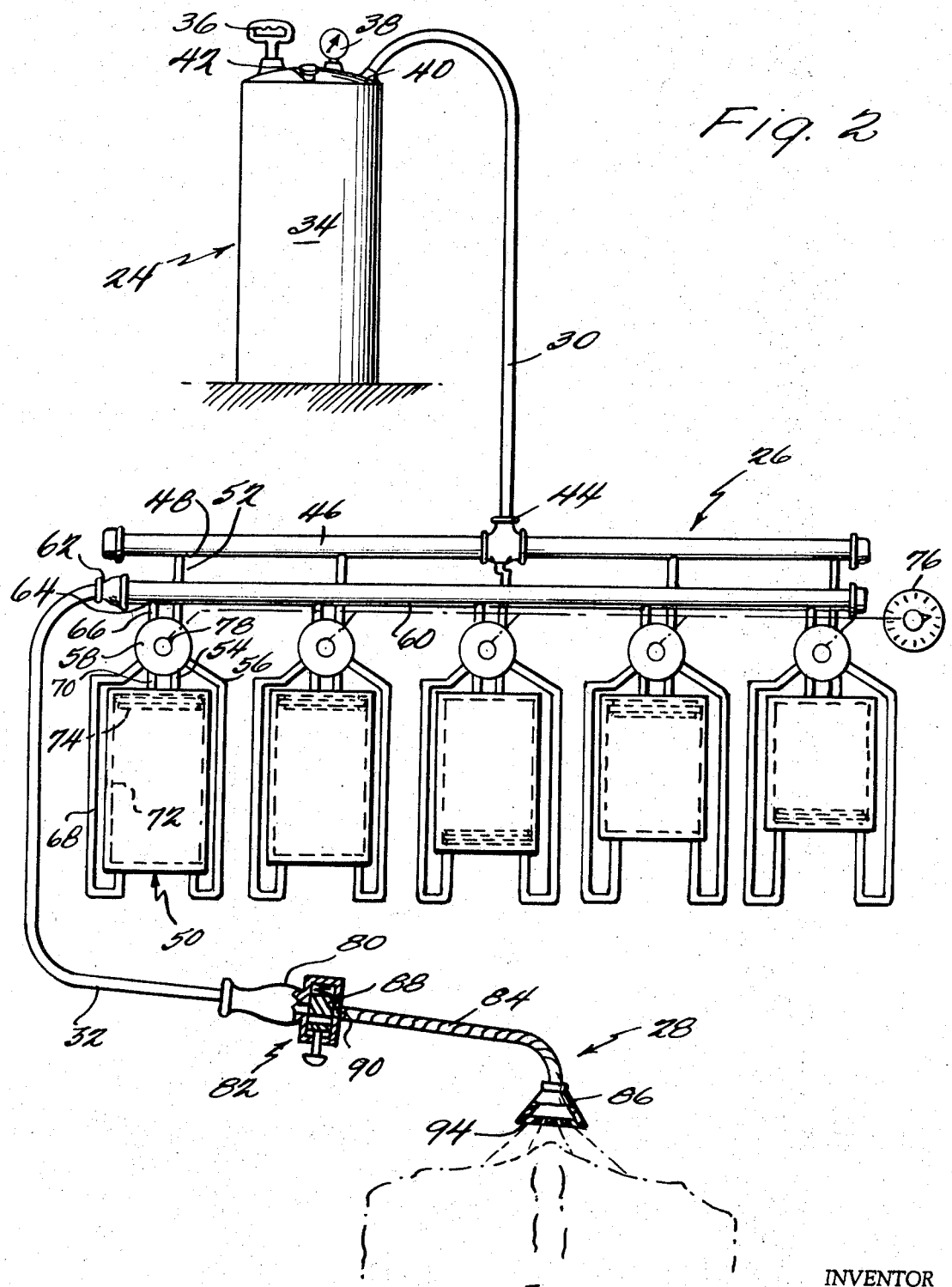
FIG. 2 is a schematic representation of a preferred mode of carrying out the present invention illustrating the manner in which the solution reservoir, applicator and metering device are interconnected.

As shown in FIG. 2, fluid line 30 leads from exhaust port 40 of container 34 to the inlet port 44 of supply manifold 46 in the metering device. The supply manifold 46 is a tubular member that is capped at each end and provided with a plurality of outlet ports 48 which are interconnected to cylinders 50 through fluid lines 52, 54, 56 and valves 58 which regulate the flow of solution between lines 52 and lines 54, 56. The metering device 26 is also provided with a discharge manifold 60 having an exhaust port 62 that leads through fluid line 32 to applicator 28 and inlet ports 64 that are interconnected to cylinders 50 through fluid lines 66, 68, 70 and valves 58 with valves 58 regulating the flow of solution from lines 68, 70 to lines 66 as well as the flow of solution from lines 52 to lines 54, 56 as will be explained more fully hereinafter. Fluid lines 54 and 70 are connected to cylinder ports leading to cylinder bores 72 on the upper side of floating pistons 74 while fluid lines 56 and 68 are connected to cylinder ports leading to cylinder bores 72 on the underside of floating pistons 74.

As shown in FIG. 2, cylinders 50 vary in capacity due to the lengths of the cylinder bores 72 and, consequently, the length of the strokes of floating pistons 74 within the cylinders 50. As shown, the length of the stroke within each cylinder 50 diminishes from left to right so that by actuating the different valves 58, singularly or in combination, different amounts of fluid can be expelled from cylinders 50 to applicator 28.

While the capacities of the piston and cylinder assemblies in the series are shown to be governed by the length of the piston stroke, as illustrated in FIG. 2, it should be understood that other means can be provided to regulate the capacities of the various cylinders 50. For example, the diameter of the cylinder bores 72 and pistons 74 can be varied with the length of the stroke remaining the same or both the diameter of the pistons and the length of the piston strokes can be varied to alter the discharge capacities of the various cylinders 50. It is also apparent that the stroke of the pistons 74 can be regulated by other means such as threaded stops (not shown) extending through and inwardly beyond the end faces of the cylinders to engage the pistons and thereby limit their strokes and permit adjustment of the same. Many other equivalent structures can be resorted to to vary the capacity of the various assemblies and, while as illustrated, the metering device comprises a series of cylinders 50 with two-way floating pistons 74, it is contemplated that a unitary cylinder assembly can be provided with a means for regulating the stroke of the piston to effect the discharge of selected amounts of solution from the cylinder as required.

Figure 3:
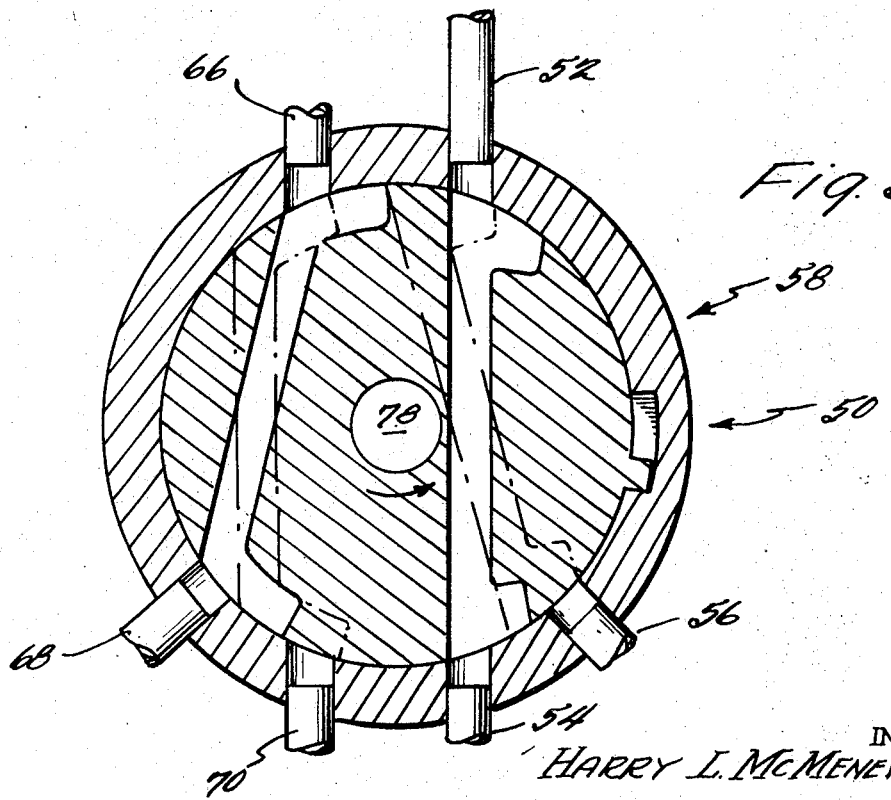
FIG. 3 is a schematic representation of a valve utilized to control the flow of solution to and from a cylinder in the metering device.

Referring now to FIG. 3, the valves 58, which regulate the flow of solution to and from the cylinders 50, are schematically shown. As illustrated, lines 52 from supply manifold 46 can be connected with either lines 54, as shown in solid line, or lines 56, as shown in phantom line, to thereby regulate the flow of solution to either the upper or lower sides of pistons 74 in the cylinders 50. Likewise, discharge lines 66 from discharge manifold 60 can be connected to either lines 68, as shown in solid line, or lines 70, as shown in phantom line, thereby regulating the flow of fluid from cylinders 50 to the discharge manifold 60.

As can be readily seen from FIGS. 2 and 3, with valves 58 in the position shown in solid line in FIG. 3, pressurized solution flows from the reservoir 24 through manifold 46 and lines 52, 54 to the upper sides of the pistons 74 and solution flows from the undersides of pistons 74 through lines 68, 66 to discharge manifold 60 and applicator 28. Alternatively, when the valves 58 are in the position shown in phantom lines, the pressurized solution flows from reservoir 24 through manifold 46 and lines 52, 56 to the cylinders 50 on the underside of pistons 74 and the fluid is exhausted from the upper sides of piston 74 through lines 70, 66 and manifold 60 to the applicator 28. In either position, once the applicator valve is actuated, the pressure exerted on the piston by the fluid from the supply reservoir effects the movement of the piston and causes the discharge of fluid into the discharge manifold and out through the applicator 28. Of course, after an operating cycle is complete, the valve switches 76, which are affixed to shafts 78, have to be set to the other position when the cylinders are to be used again since the solution has been expelled from the bores 72 on the side of the piston in communication with the discharge manifold.

While the valve illustrated (valve 58) is a rotary valve, it is to be understood that the invention is in no way restricted to the specific valve shown and that other types of valves can be utilized, such as sliding spool valves, or other conventional valves. Furthermore, it is contemplated that a master valve can be utilized wherein the movement of the one valve to a particular position could regulate the flow of solution to and from the entire series of cylinders 50.

Turning now to the applicator 28, which is interconnected to discharge manifold 60 through flexible fluid line 32, the applicator is made up of hand-grip 80 with a spring-biased on-off valve 82 and an extension of semi-rigid tubing 84, which can be bent, as required, and an outlet nozzle 86 mounted on the end of tubing 84 for dispensing the solution onto the animal. The on-off valve 82 is of conventional construction with a spring-biased piston 88 having an aperture 90 therethrough which is aligned with the fluid line when the button 92 is depressed and out of registry with the line, thereby stopping the flow of solution from the applicator, when the button is not depressed. As shown in the preferred form, the nozzle 86 is a fan-type nozzle with a series of apertures 94 through which the solution flows from the extension 84 onto the animal. While a fan-type nozzle is shown, it is contemplated that other types of nozzles can be utilized where necessitated.

IN OPERATION

When it is desired to apply a specified amount of solution to an animal, the operator actuates either one or a combination of the valves 58 for the separate cylinders 50 to obtain the correct dosage and then when the animal is in position, the operator actuates the on-off valve 82 in the applicator 28 to either pour-on, spot-on or otherwise apply the solution to the animal. Upon the actuation of the on-off valve 82 on the applicator, the valves 58, which have been set, allow the solution in the supply manifold 46, which is maintained under pressure by pump 36 in the tank 34, to flow into the selected cylinders on one side of the pistons. Since the solution flowing into the cylinders is pressurized and the solution on the other side of the pistons in the selected cylinders is vented to the atmosphere through applicator 28, the solution flowing into the cylinders causes the pistons 74 to move to the other ends of the cylinders thereby expelling the solution from the other side of the pistons and, at the same time, refilling the cylinders so that the assembly is ready for another application cycle immediately upon the completion of the present application cycle. Therefore, when the next animal is in position for treatment, merely by turning the valves back to their initial position, the same amount of fluid can be applied to the next animal or if the animal is of a different weight, other valves or combinations of valves can be set to achieve the desired dosage.

For example, the device can be used for the application of cattle insecticides comprising 1 to 15 percent of active ingredient:

O,O - diethyl O - (3 - chloro - 4 - methyl - 2 - oxo - (2H)-1-benzopyran-7-yl) phosphorothioate or Dimethyl (2,2,2-trichloro-1-hydroxyethyl) phosphonate and the remainder comprising inert ingredients with the former insecticide having a preferred concentration of 4 percent active ingredient to 96 percent inert ingredient and the latter insecticide having a preferred concentration of 8 percent active ingredient to 92 percent inert ingredient. These cattle insecticides, when applied by the pour-on method wherein the solution is poured evenly down the backline of the animal for the control of cattle grubs, are applied in amounts from one-fourth to 1¼ ounces per hundred pounds of body weight of the animal. However, with the preferred concentrations of active ingredients mentioned above, the solution is applied at the rate of one-half ounce per 100 pounds of body weight with the latter mentioned insecticide having a maximum of 4 ounces per animal. Therefore, when using the above solutions for the treatment of cattle, the metering device 26 has one cylinder assembly with a one-half ounce capacity and successive assemblies of 1, 2, 3, 4 ounces capacities with as many cylinder assemblies 50 being utilized as required. In this manner, through the use of one or more assemblies, the desired amount of insecticide or solution can be delivered for each animal with two cylinders 50 being activated when 1½, 2½, 3½ or 4½ ounce quantities of solution are required. Of course, if desired, additional cylinders 50 can be incorporated into the metering device 26 with 1½, 2½, 3½ ounce etc. capacities if one wished to activate only one valve per application.

Another example of the use of the present assembly is in a spot-on treatment where the nozzle of the applicator 28 is actually placed in contact with the animal to penetrate the hair at one location rather than pouring the solution down the animal's backline. When using such a technique, a much more concentrated solution is required and insecticides, such as insecticides utilizing active ingredients of:

O,O-diethyl O-(3-chloro-4-methyl-2-oxo-(2H)-1-benzopyran-7-yl) phosphorothioate or Dimethyl (2,2,2-trichloro-1-hydroxyethyl) phosphonate are utilized in ranges up to 95 percent active ingredients with up to 50 percent active ingredients preferred. When using the spot-on technique and the concentrated solution, the individual cylinder assemblies 50 have capacities measured in milliliters rather than ounces with 1 to 3 milliliters of solution being required per hundred pounds of body weight and with 60 milliliters per animal being the maximum amount of solution applied, 44 milliliters being the preferred upper limit.

While the preferred form of the invention has been shown and described, it is to be understood that all suitable modifications and equivalents may be resorted to which fall within the scope of the invention.

I claim:

1. Dispenser for applying solutions and the like on livestock comprising:
   solution reservoir means;
   solution applicator means;
   solution metering means intermediate said solution reservoir means and said solution applicator means for selectively regulating the quantity of solution supplied to said applicator means upon each actuation of said dispenser; and
   pressurizing means for maintaining pressure on said solution within said dispenser to cause the flow of solution from said solution applicator means upon each actuation of said dispenser, said metering means comprising cylinder means with floating piston means and regulator valve means intermediate said cylinder means and said solution reservoir means and said solution applicator means for regulating the flow of solution from said solution reservoir means to said cylinder means and from said cylinder means to said fluid applicator means.

2. In the dispenser of claim 1:
   said cylinder means comprising a plurality of cylinders of differing capacities, each of said cylinders having a floating piston therein with opposing sides of each of said floating pistons being alternately in communication with said solution reservoir means and said solution applicator means respectively.

3. In the dispenser of claim 2:
   said regulator valve means being a plurality of valves with a valve being located intermediate each of said cylinders and said solution reservoir means and said solution applicator means for independently governing the flow of solution to and from each of said cylinders.

4. In the dispenser of claim 3:
   said solution applicator means having on-off control valve means for initiating and terminating the flow of solution from said dispenser.

5. In the dispenser of claim 1:
   said solution applicator means having on-off control valve means for initiating and terminating the flow of solution from said dispenser.

6. In the dispenser of claim 1:
   said solution applicator means having a fan-type nozzle for directing the solution from the dispenser onto the livestock.

7. A device for applying solution to livestock comprising:
   solution reservoir means;
   pressure means for maintaining a solution within said device under pressure;
   solution applicator means for applying solution on the livestock, said solution applicator means having control valve means for initiating and terminating the flow of solution from said device, and said solution applicator means having nozzle means for directing solution onto the livestock; and
   metering means intermediate said solution reservoir means and said solution applicator means for regulating the quantity of solution supplied to said applicator means during each actuation of said control valve means, said metering means comprising cylinder means with floating piston means, regulator valve means intermediate said cylinder means and said solution reservoir means and said solution applicator means, said regulator valve means regulating the flow of solution from said solution reservoir means to said cylinder means and from said cylinder means to said solution applicator means with opposing sides of said floating piston means being alternately in communication with said solution reservoir means and said solution applicator means respectively whereby upon actuation of said regulator valve means and said control valve means pressure exerted on said floating piston means by solution flowing into said cylinder means from said solution reservoir means causes movement of said floating piston means to expel solution from said cylinder means out through said solution applicator means and onto the livestock while at the same time the solution flowing into said cylinder means refills said cylinder means so that said device is ready for the next operating cycle.

8. In the device of claim 6:
   said cylinder means comprising a plurality of cylinders with differing capacities, each cylinder having a floating piston.

9. In the device of claim 6:
   said regulator valve means comprising a plurality of valves for independently governing the flow of solution to and from each c